(12) United States Patent
Yoda

(10) Patent No.: US 9,038,681 B2
(45) Date of Patent: May 26, 2015

(54) HEAVY LOAD PNEUMATIC TIRE FOR CONSTRUCTION VEHICLES

(75) Inventor: Hidetoshi Yoda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/880,528

(22) PCT Filed: Oct. 24, 2011

(86) PCT No.: PCT/JP2011/005946
§ 371 (c)(1),
(2), (4) Date: Apr. 19, 2013

(87) PCT Pub. No.: WO2012/053227
PCT Pub. Date: Apr. 26, 2012

(65) Prior Publication Data
US 2013/0206299 A1     Aug. 15, 2013

(30) Foreign Application Priority Data

Oct. 22, 2010    (JP)  ................................. 2010-237740

(51) Int. Cl.
*B60C 11/11*      (2006.01)
*B60C 11/03*      (2006.01)

(52) U.S. Cl.
CPC ............. *B60C 11/11* (2013.01); *B60C 11/0311* (2013.04); *B60C 11/033* (2013.04); *B60C 2200/065* (2013.04); *B60C 2011/0313* (2013.04); *B60C 2011/0374* (2013.04)

(58) Field of Classification Search
CPC ...... B60C 11/04; B60C 11/11; B60C 11/033; B60C 11/0311; B60C 11/036; B60C 11/0306; B60C 11/0309; B60C 11/0302; B60C 2011/0374; B60C 2011/0313; B60C 2011/0358; B60C 2011/0311; B60C 2200/06; B60C 2200/065; B60C 2011/0353; B60C 2011/0365; B60C 2011/0376

USPC ............ 152/209.18, 209.12, 209.13, 209.27, 152/209.28; D12/533, 536, 541, 559, 560, D12/575

See application file for complete search history.

(56) References Cited

U.S. PATENT DOCUMENTS 7,281,555 B2 * 10/2007 Ono ......................... 152/209.15
2004/0134580 A1    7/2004 Colombo et al.
(Continued)

FOREIGN PATENT DOCUMENTS

JP      S62-031503 A      2/1987
JP      A-63-138203      9/1988
(Continued)

OTHER PUBLICATIONS

International Search Report issued in International Patent Application No. PCT/JP2011/005946 dated Jan. 31, 2012.
(Continued)

*Primary Examiner* — Eric Hug
(74) *Attorney, Agent, or Firm* — Oliff PLC

(57) ABSTRACT

Side lug rows are provided at both side regions of a tread surface and are formed by a plurality of lugs defined by lug grooves opening to edges in the tread width direction, and a central block row aligned on the tire equator and formed by a plurality of blocks is disposed between positions at ¼ of the tread surface width from the tire equator. The tire has a directional tread pattern, with a designated rotation direction, formed by circumferential grooves and width direction grooves that define the blocks of the central block row and are narrow grooves with a narrower groove width than the lug grooves. The distance from the tire equator to the groove wall in each of the circumferential grooves defining the blocks is set to be larger at a leading edge of each block than at a trailing edge of each block.

6 Claims, 3 Drawing Sheets

(56) References Cited

U.S. PATENT DOCUMENTS

| | | | | |
|---|---|---|---|---|
| 2010/0300588 | A1* | 12/2010 | Otsuji | 152/209.16 |
| 2012/0060990 | A1* | 3/2012 | Otsuji | 152/209.28 |

FOREIGN PATENT DOCUMENTS

| | | |
|---|---|---|
| JP | A-4-154407 | 5/1992 |
| JP | H06072106 A | 3/1994 |
| JP | A-9-300917 | 11/1997 |
| JP | A-2000-94907 | 4/2000 |
| JP | 2000-264022 A | 9/2000 |
| JP | A-2003-146017 | 5/2003 |
| JP | 2004-155335 A | 6/2004 |
| JP | A-2004-520998 | 7/2004 |
| JP | 2006-151083 A | 6/2006 |
| JP | A-2008-279976 | 11/2008 |
| WO | WO 2009/069585 * | 6/2009 |
| WO | 2010/89969 A1 | 8/2010 |

OTHER PUBLICATIONS

Dec. 31, 2014 Office Action issued in CN Application No. 201180057640.0.

Jan. 6, 2015 Office Action issued in Japanese Application No. 2012-539615.

* cited by examiner

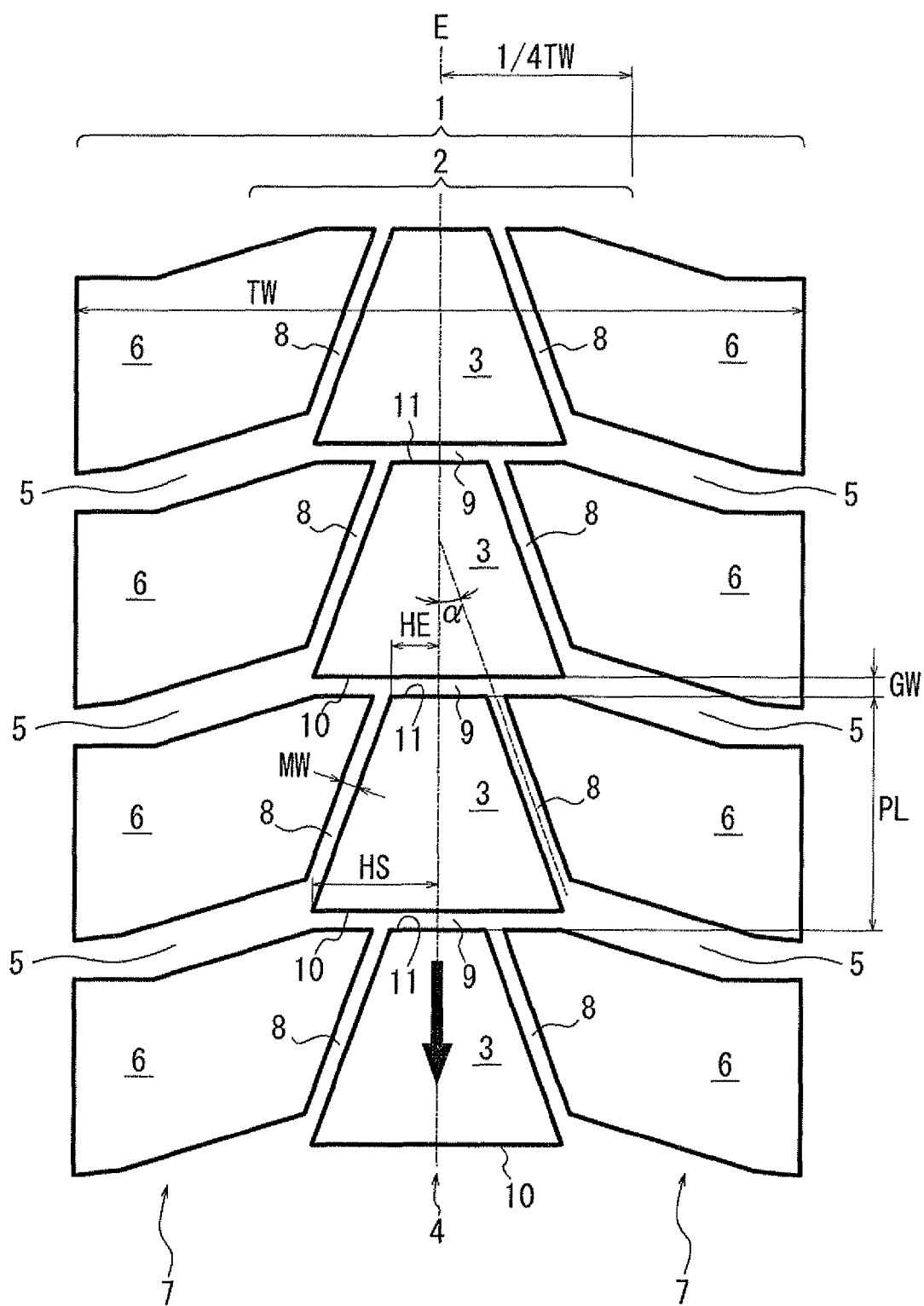

HEAVY LOAD PNEUMATIC TIRE FOR CONSTRUCTION VEHICLES

TECHNICAL FIELD

The present invention relates to heavy load pneumatic tires, suitable for use in construction vehicles that transport mineral ore and overburden at locations such as mines, and to a tread pattern thereof. In particular, a technique is proposed for effectively preventing tread damage caused by heat generation while guaranteeing excellent wear resistance.

BACKGROUND ART

In order to enhance the wear resistance of a tire tread, it is effective to reduce the negative ratio, i.e. the groove area ratio, of a central region of the tread surface (a range, centered on the tire equator, of 50% of the tread surface width, i.e. of the tread contact width given by the linear distance in the tire axial direction between outermost contact edges in the tire axial direction in the tire ground contact area with a flat plate, for a tire mounted on an applicable rim, with specified air pressure and maximum load capability applied, in a vertical position with a camber angle of zero degrees), thereby enhancing the land portion rigidity and suppressing deformation of the land portion. In this case, however, due to a reduction in heat dissipation efficiency of the heated tire tread, heat damage occurs more easily, such as separation of the central region of the tire tread from the peripheral surface of the belt.

Here, an "applicable rim" refers to a rim specified by the standards below in accordance with tire size. "Specified air pressure" refers to air pressure specified by the standards below in accordance with the maximum load capability. The "maximum load capability" refers to the maximum mass that the tire is allowed to bear according to the standards below.

Note that the air referred to here can be substituted with, for example, an inert gas such as nitrogen gas.

The standards are valid industrial standards for the region in which the tire is produced or used, such as "The Tire and Rim Association, Inc. Year Book" in the United States of America, "The European Tyre and Rim Technical Organisation Standards Manual" in Europe, and the "JATMA Year Book" of the Japan Automobile Tire Manufacturers Association in Japan.

Therefore conventionally, the heat dissipation effect of the tread is enhanced by providing circumferential grooves, in the central region of the tread surface, extending continuously in the tread circumferential direction in a straight line, a zigzag pattern, or the like.

Providing circumferential grooves in the central region of the tread surface, however, facilitates width direction deformation when the tire is rotated with load applied thereon, whereby the tread surface deforms inwards in the tread width direction upon leading and returns elastically outwards in the tread width direction upon trailing. In particular, the problem arises that in tires mounted on the front axle of a heavy load vehicle, a large width direction deformation occurs centered on positions that are at ¼ of the tread surface width from the tire equator, causing wear to progress from the ¼ positions.

To address this problem, the circumferential grooves in the central region of the tread surface can be made narrow, as disclosed for example in Patent Literature 1, in order to suppress deformation in the central region and thus improve the wear resistance.

CITATION LIST

Patent Literature

PTL 1: JP2008279976A

SUMMARY OF INVENTION

In a tire with a reduced negative ratio in the central region of the tread surface in order to enhance the wear resistance, however, providing circumferential narrow grooves in the central region of the tread surface up to positions that are at ¼ of the tread surface width from the tire equator so as to improve the heat dissipation effect causes an increase, due to the form of the circumferential grooves, in the amount of deformation inwards in the width direction in land portions at side regions located outwards in the width direction from the ¼ positions. Early wear thus occurs in the land portions in the side regions.

As a measure against this phenomenon, the amount of deformation of the land portions in the side regions has typically been suppressed by providing the circumferential narrow grooves only at the tire equator position or by reducing the groove width of the circumferential narrow grooves.

It is an object of the present invention to provide a heavy load pneumatic tire for construction vehicles that can not only further enhance the wear resistance of the land portion in the central region of the tread surface and the land portions in the side regions, but also effectively prevent heat damage at the central region of the tread surface.

A heavy load pneumatic tire for construction vehicles according to the present invention comprises side lug rows, at both side regions of a tread surface, formed by a plurality of lugs defined by lug grooves each opening to a respective tread end in a tread width direction, and a central block row aligned on a tire equator and formed by a plurality of blocks disposed in a central region of the tread surface covering a range from the tire equator to positions at a distance of ¼ of the tread surface width, i.e. the tread contact width as described above, the blocks being disposed between the ¼ positions. The tire further comprises a directional tread pattern, with a designated rotation direction, formed by circumferential grooves and width direction grooves that define the blocks of the central block row and have groove widths narrower than that of the lug grooves. Each of the circumferential grooves defining the blocks for example extends in a straight line inclined with respect to the tire equator, and a distance from the tire equator to a groove wall in each of the circumferential grooves is larger at a leading edge of each block than at a trailing edge of each block.

The "directional tread pattern" as used herein refers to a pattern in which the lug grooves formed at one half of the tread surface are inclined in the same direction with respect to the tread circumferential direction, and the lug grooves formed at the other half are inclined in the opposite direction with respect to the tire equator.

Here, a negative ratio is preferably at most 20% in a central region of the tread surface between the positions at ¼ of the tread surface width from the tire equator, thereby guaranteeing the wear resistance of the central block row.

The blocks on the tire equator are preferably each shaped as a trapezoid, with the leading edge as a lower base and the trailing edge as an upper base, in a developed plan view of the tread pattern, thereby particularly increasing the amount of compression deformation of the block at the leading edge when the tire is rotated with load applied thereon. As a result, the opposing groove walls in the circumferential grooves smoothly undergo close contact from the leading edge based on the compression deformation of the block, thus effectively preventing deformation of the side lug rows inwards in the width direction.

Disposing the circumferential grooves at positions that are separated from the tire equator by at least 10% of the tread surface width and are between the positions at ¼ of the tread surface width from the tire equator is preferable, since such positions maintain the efficiency of heat dissipation from the land portions, while reliably achieving the desired close contact of the opposing groove walls of the circumferential grooves based on the compression deformation of the block.

Setting the groove width of each of the circumferential grooves and the width direction grooves such that opposing groove walls touch each other within the tire ground contact area when the tire is rotated with load applied thereon is preferable in order to enhance the wear resistance based on increased rigidity due to the blocks in the central block row becoming integrated.

An inclination angle with respect to the tire equator of each of the circumferential grooves defining the blocks is preferably in a range of 15° to 30°, and the groove width of each circumferential groove is preferably in a range of 0.5% to 2.5% of the tread surface width.

The "inclination angle" refers, in relation to the necessary manners of extension of the circumferential grooves, to the intersection angle between the tire equator and a line corresponding nearly to the circumferential edge of each block and traversing the center of the groove width between the edges in the circumferential direction.

On the other hand, the width direction grooves defining the blocks preferably extend from the tire equator in a range of at least 10% and less than 25% of the tread surface width and are each in communication with both lug grooves opening to the edges in the tread width direction, and the groove width of each of the width direction grooves is preferably in a range of 3% to 8% of a pitch length of the blocks.

In the heavy load pneumatic tire for construction vehicles according to the present invention, for example in a heavy load pneumatic radial tire, the circumferential grooves and width direction grooves defining the blocks in the central block row are, in particular, narrow grooves with a narrower groove width than the lug grooves as necessary, so that close contact between the opposing groove walls in the narrow grooves can effectively prevent excess deformation of the land portions, i.e. deformation, of the side lug rows and the central block row, exceeding a predetermined amount inwards in the tread width direction and/or in the tread circumferential direction. Undesired early wear of the side lug rows and the central block row can thus be sufficiently prevented.

Specifically, movement or deformation of the blocks in the tire ground contact area is such that movement in the circumferential direction by blocks at the center is reduced by the circumferential grooves and/or the width direction grooves closing, whereas the side lugs move considerably in the circumferential direction until the lug grooves close. In practice, however, since a portion of the side lugs is also defined by the width direction grooves and the circumferential grooves, the movement or deformation of the side lugs in the circumferential direction is restricted by the closing of the width direction grooves and/or the circumferential direction grooves. Therefore, the amount of movement or deformation of the side lugs in the circumferential direction is almost equal to that of the blocks in the central block row.

Furthermore, in this tire, by setting the distance from the tire equator to the groove wall in the circumferential grooves defining the blocks to be greater at the leading edge of the block than at the trailing edge, the opposing groove walls in the circumferential narrow grooves approach or enter close contact gradually from the leading edge when the block contacts the ground, thereby suppressing movement of the side lugs inwards in the tread width direction. For these reasons, early wear of the side lug rows and the central block row can be effectively prevented.

Here, since both the circumferential grooves and the width direction grooves defining the blocks in the central block row can sufficiently function as heat dissipation grooves for heat generated by deformation of the blocks, the central region of the tread surface can be sufficiently cooled, and heat damage to the central region can be effectively prevented.

In such a tire, setting the negative ratio of the central region of the tread surface between the tire equator and the positions at ¼ of the tread surface width TW from the tire equator to be 20% or less guarantees heat dissipation efficiency while enhancing the rigidity of the land portion in the central region of the tread surface and suppressing deformation of the land portion in the central region. The wear resistance of the central region of the tread surface can thus be further enhanced.

By shaping each of the blocks on the tire equator as a trapezoid, with the leading edge as a lower base and the trailing edge as an upper base, in a developed plan view of the tread pattern, the opposing groove walls of the circumferential narrow grooves are caused to undergo particularly close contact, or to greatly approach each other, based on a large deformation of the block upon leading. Therefore, movement inwards in the tread width direction by the lugs in the side lug rows is suppressed, so that early wear of the side lug rows can be effectively prevented.

Disposing the circumferential narrow grooves at positions that are separated from the tire equator by at least 10% of the tread surface width and are between the positions at ¼ of the tread surface width from the tire equator guarantees the heat dissipation effect by the circumferential grooves while reliably achieving the necessary close contact of the opposing groove walls in the circumferential grooves.

Specifically, if the positions at which the circumferential grooves are disposed are less than 10% from the tire equator, the volume of the blocks in the central block row becomes too small, leading to the risk of insufficient close contact of the opposing groove walls based on the compression deformation of the blocks. On the other hand, the distance from the tire equator by more than ¼ leads to the risk of the circumferential grooves not being able to effectively dissipate heat at the central region of the tread surface.

Setting the groove width of each of the circumferential grooves and the width direction grooves to be such that the opposing groove walls touch each other within the tire ground contact area when the tire is rotated with load applied thereon effectively prevents deformation of the side lug rows inwards in the tread width direction and effectively prevents deformation of the blocks in the central block row in the tread circumferential direction. The risk of uneven wear, such as heel and toe wear, can thus be eliminated.

The inclination angle with respect to the tire equator of each of the circumferential grooves defining the blocks is preferably in a range of 15° to 30°, and in conjunction, the groove width of each circumferential groove is preferably in a range of 0.5% to 2.5% of the tread surface width.

In other words, if the angle is less than 15°, it becomes difficult to expect that the opposing groove walls of the circumferential narrow grooves will approach each other or enter close contact sufficiently due to the difference in movement between the central blocks and the side lugs, thereby making it difficult to effectively suppress movement inwards in the tread width direction by the side lug rows.

On the other hand, exceeding 30° prevents the guarantee of sufficient rigidity due to the corners of the central blocks and the side lugs by the circumferential narrow grooves forming an angle that is too acute, thereby increasing movement of these locations and leading to an increased risk of local wear and chipping of the land portion corners.

If the ratio is less than 0.5%, it becomes difficult to expect the air cooling effect of the circumferential narrow grooves when the tire is rotated with load applied thereon, causing the risk of the temperature in the central block row becoming too high. Conversely, a ratio exceeding 2.5% makes it difficult for the opposing groove walls to contact each other in the tread contact region, causing the risk of not being able to increase rigidity through integration of the central block row.

Here, the width direction grooves defining the blocks in conjunction with the circumferential grooves preferably extend from the tire equator in a range of at least 10% and less than 25% of the tread surface width and are each in communication with both lug grooves opening to the edges in the tread width direction, and the groove width of each of the width direction grooves is preferably in a range of 3% to 8% of a predetermined pitch length of the blocks.

Here, if the width of the width direction grooves is less than 3% of the pitch length of the blocks, it becomes difficult to expect the air cooling effect of the width direction grooves when the tire is rotated with load applied thereon, whereas upon exceeding 8%, it becomes difficult for the opposing groove walls to touch each other in the tread contact region.

BRIEF DESCRIPTION OF DRAWINGS

The present invention will be further described below with reference to the accompanying drawings, wherein:

FIG. 2 is a development view, similar to FIG. 1, illustrating another embodiment in which the manner of extension of the lug grooves is modified.

DESCRIPTION OF EMBODIMENTS

Figure 1:
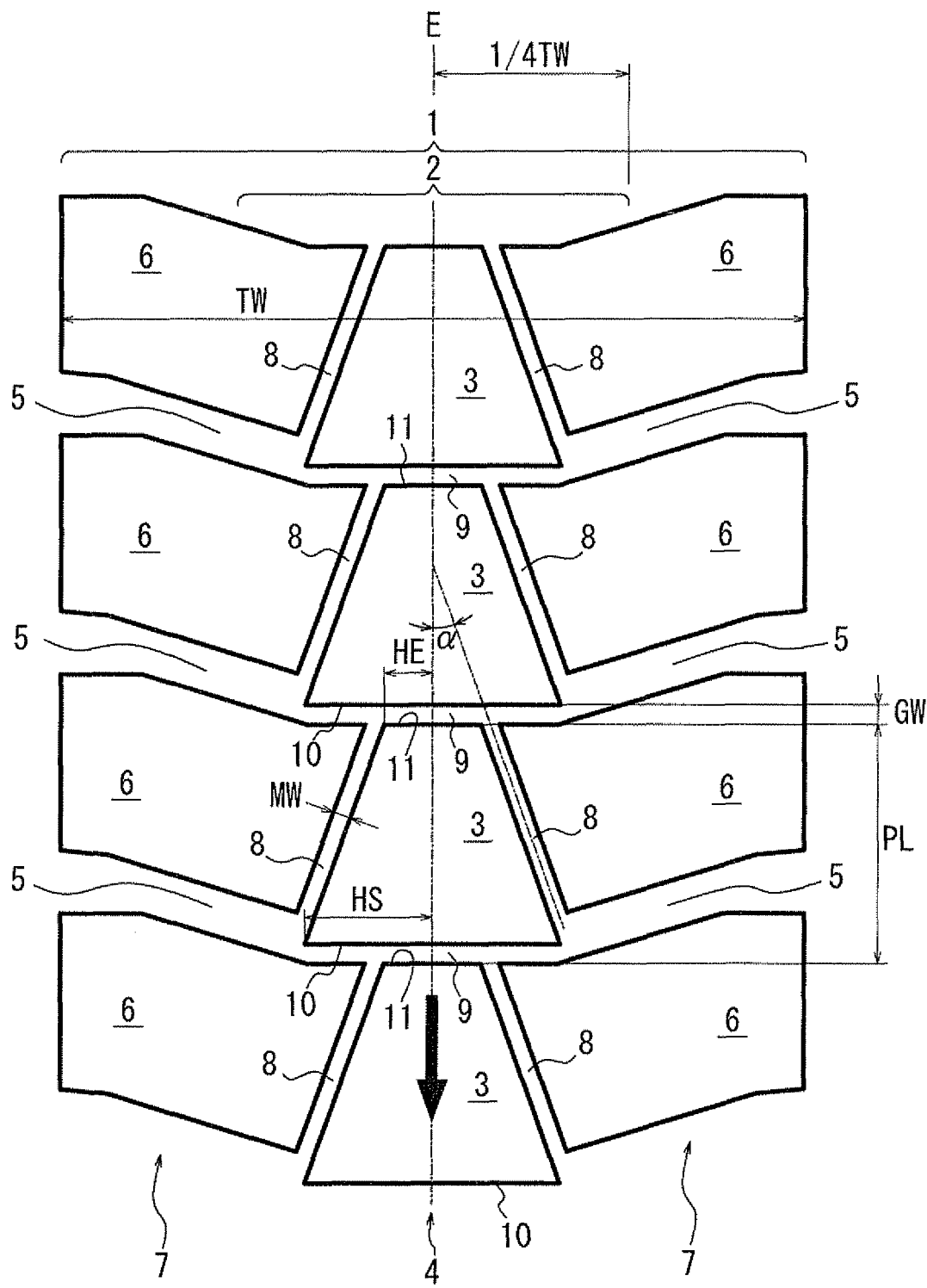
FIG. 1 is a partial development view of a tread pattern illustrating an embodiment of the present invention.

An embodiment of the present invention will be described based on the illustration in FIG. 1.

The heavy load pneumatic tire for construction vehicles according to the present invention, in particular the tread pattern, comprises a central block row 4 formed by a plurality of blocks 3 aligned on the tire equator E in a central region 2 of a tread surface 1, the central region 2 extending from the tire equator E to a distance ¼ of the tread surface width TW from either side of the tire equator E, and comprises side lug rows 7, at side regions of the tread surface 1 on both sides of the central block row 4, formed by a plurality of lugs 6 defined by a plurality of lug grooves 5 at a predetermined pitch that open to the edges in the tread width direction.

The internal structure of the illustrated tire may be the same as that of a conventional, regular heavy load pneumatic tire for construction vehicles, such as a pneumatic radial tire. The internal structure is therefore omitted from the figures.

Furthermore, as shown in FIG. 1, circumferential grooves 8 and width direction grooves 9 that define the blocks 3 of the central block row 4 are provided with a narrower groove width than the lug grooves 5. The opposing groove walls in the grooves located within the tire ground contact area when the tire is rotated with load applied thereon are more preferably grooves narrow enough to contact closely, i.e. the groove width is such that the groove walls contact closely within the tire ground contact area under a load corresponding to the maximum load capability under application of air pressure stipulated by standards such as TRA. Based on the form of the grooves 5, 8, and 9, the entire tread pattern is set to be a directional pattern with a designated rotation direction, such that at one half of the tread, the lug grooves 5 and the circumferential grooves 8 are inclined in the same direction with respect to the tire equator E, and at the other half of the tread, on the other side of the tire equator, the grooves 5 and 8 are inclined in the opposite direction with respect to the tire equator E.

Here, the distance (HS, HE) from the tire equator E of the groove wall in each of the circumferential grooves 8 defining the blocks 3 is set to be larger at a leading edge 10 of each block 3 than at a trailing edge 11 of each block 3.

As shown in FIG. 1, the lug grooves 5 are set somewhat inwards towards the equator E from the positions that are at ¼ of the tread surface width TW as measured from the tire equator E, so that the side lug rows 7 protrude into the central region 2 of the tread surface.

In a pneumatic tire with this sort of tread pattern, the heat generated in the central region 2 of the tread surface is sufficiently dissipated based on the heat dissipation effect of the circumferential grooves 8 and the width direction grooves 9, thereby effectively preventing heat damage to the central region 2.

Furthermore, by providing the circumferential grooves 8 and the width direction grooves 9 with a narrow width as necessary, so that close contact between the opposing groove walls in the narrow grooves 8 and 9 prevents more than a predetermined amount of deformation of the side lug rows 7 and the central block row 4 inwards in the tread width direction and/or in the tread circumferential direction, as described above, the wear resistance of the side lug rows 7 and the central block row 4 can be effectively enhanced.

Furthermore, by setting the distance (HS, HE) from the tire equator of the groove wall in each of the circumferential grooves 8 defining the blocks 3 to be larger at the leading edge 10 than at the trailing edge 11 of each block 3, the length of the leading edge 10 in the tread width direction is made longer than the length of the trailing edge 11 in the tread width direction, and the amount of elongation in the tread width direction during compression deformation of the block 3 is made greater at the leading edge 10 than at the trailing edge 11 of the block. Based on the compression deformation of the block, the close contact between the opposing groove walls of the circumferential grooves thus progresses smoothly from the leading edge 10 to the trailing edge 11 of the block, so that deformation of the side lug rows 7 inwards in the tread width direction is effectively restrained in the tire ground contact area, thereby allowing for prevention of early wear of the side lug rows 7.

Here, setting the negative ratio of the central region 2 of the tread surface between the tire equator E and the positions at ¼ of the tread surface width TW from the tire equator E to be 20% or less enhances the land portion rigidity of the central region 2 of the tread surface and suppresses deformation of the central region 2. As a result, the wear resistance of the central region 2 of the tread surface can be further enhanced.

In this tire, the blocks 3 aligned on the tire equator E are more preferably each shaped as a trapezoid in the development view of the tread pattern as shown in FIG. 1, with the leading edge as the lower base and the trailing edge as the upper base. The circumferential grooves 8 are also preferably separated from the tire equator E by at least 10% of the tread surface width TW and are disposed between the positions at ¼ of the tread surface width from the tire equator E.

Furthermore, the respective groove widths MW and GW of the circumferential grooves 8 and the width direction grooves 9 are preferably such that opposing groove walls touch each other within the tire ground contact area when the tire is rotated with load applied thereon.

In relation to the inclination angle, with respect to the tire equator E, of the circumferential grooves 8 defining the blocks 3, the distance (HS, HE) from the tire equator E of the groove wall in the circumferential grooves 8 that defines the block 3 is, at the leading edge 10 of the block 3, preferably in a range of 1.2 to 2.5 times the distance at the trailing edge 11, and a groove width MW of the circumferential grooves 8 is preferably in a range of 0.5% to 2.5% of the tread surface width TW. Furthermore, the width direction grooves 9 defining the block 3 preferably extend from the tire equator E in a range of at least 10% and less than 25% of the tread surface width TW and are in communication with the lug grooves 5 opening to the edges in the tread width direction, and the groove width GW of each of the width direction grooves 9 is preferably in a range of 3% to 8% of a predetermined pitch length PL of the blocks 3.

While the embodiment illustrated in the figure has been described, the pair of circumferential grooves 8 that are located on either side of the tire equator E and define the blocks 3 need not extend in a straight line between the width direction grooves 9, but rather may be bent, curved, or the like once or multiple times.

The width direction grooves 9 may also be inclined diagonally with respect to the tire equator E.

As another embodiment of the present invention, a pneumatic tire with the tread pattern of the development view in FIG. 2 is as in FIG. 1, with a modification to the manner of extension of the lug grooves 5. In the tire illustrated in FIG. 1, the lug grooves 5 are inclined upwards in the figure while extending away from the tire equator, whereas in FIG. 2, the lug grooves 5 are inclined downwards. Otherwise, the structure is the same as the embodiment illustrated in FIG. 1.

The same effects described for the embodiment illustrated in FIG. 1 can also be obtained with the pneumatic tire illustrated in FIG. 2.

EXAMPLES

Figure 3A:
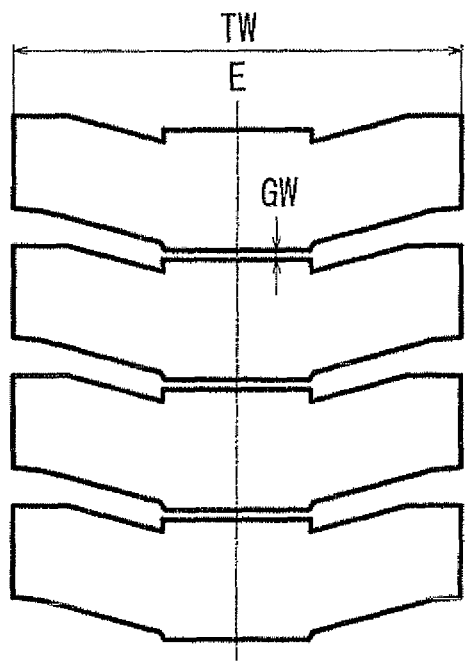
FIGS. 3A and 3B are similar diagrams to FIGS. 1 and 2, illustrating the tread pattern of tires used in Examples.
Figure 3B:
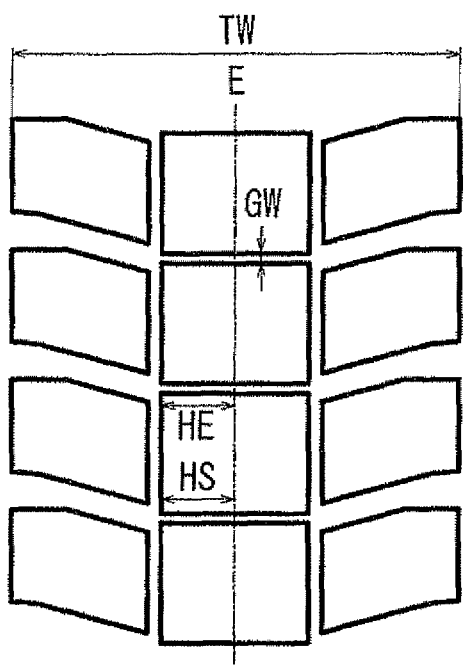

With a tire size of 46/90 R57, a Control Tire having the tread pattern illustrated in FIG. 3(*a*), a Comparative Tire 2 having the tread pattern illustrated in FIG. 3(*b*), and an Example Tire and Comparative Tire 1 having the tread pattern illustrated in FIG. 1 as a basic form were mounted on the front axle of a 240 t dump truck in use at a mine. The tread rubber temperature and the wear rate (wear amount/running time) were calculated as assessment indices between positions at ¼ of the tread surface width from the tire equator. Table 1 shows the results.

As shown in Table 1, whereas the wear resistance generally deteriorates upon adding narrow grooves in the circumferential direction in order to reduce the tread rubber temperature, the way the present narrow grooves were added reduces the tread rubber temperature without substantially deteriorating the wear resistance as compared to the Control Tire.

Furthermore, among the Example Tires, it is clear in particular that setting the inclination angle of the circumferential grooves with respect to the equator to be in a range of 15° to 30° effectively brings out the heat dissipation function in the central region of the tread surface while barely deteriorating the wear resistance.

REFERENCE SIGNS LIST

1: Tread surface
2: Central region of the tread surface
3: Block
4: Central block row
5: Lug groove
6: Lug
7: Side lug row
8: Circumferential groove
9: Width direction groove
10: Leading edge
11: Trailing edge
E: Tire equator
TW: Tread surface width
HS, HE: Distance
MW: Circumferential groove width
GW: Width direction groove width
PL: Pitch length

The invention claimed is:

1. A heavy load pneumatic tire for construction vehicles comprising:
    side lug rows, at both side regions of a tread surface, formed by a plurality of lugs defined by lug grooves each opening to a respective tread end in a tread width direction, and a central block row aligned on a tire equator and formed by a plurality of blocks disposed between positions at ¼ of a tread surface width from the tire equator; and
    a directional tread pattern, with a designated rotation direction, formed by circumferential grooves and width direction grooves that define the blocks of the central block row and have groove widths narrower than that of the lug grooves, wherein

TABLE 1

| | Control Tire | Example Tire 1 | Example Tire 2 | Example Tire 3 | Comparative Tire 1 | Comparative Tire 2 |
|---|---|---|---|---|---|---|
| Width direction groove width GW (GW/TW: 1000 mm) | 12 mm (1.2%) | — | — | — | — | — |
| HS/HE | No circumferential grooves | HS > HE | HS > HE | HS > HE | HS < HE | HS = HE |
| Circumferential groove angle α | — | 20° | 10° | 40° | −20° | 0° |
| Wear rate (smaller value better) | 100 | 101 | 104 | 103 | 110 | 110 |
| Tread rubber temperature (smaller value better) | 100 | 90 | 93 | 90 | 90 | 92 | a distance from the tire equator to a groove wall in each of the circumferential grooves defining the blocks is larger at a leading edge of each block than at a trailing edge of each block, and the blocks on the tire equator are each shaped as a trapezoid, with the leading edge as a lower base and the trailing edge as an upper base, in a developed plan view of the tread pattern.

2. The heavy load pneumatic tire for construction vehicles according to claim 1, wherein a negative ratio is at most 20% in a central region of the tread surface between the positions at ¼ of the tread surface width from the tire equator.

3. The heavy load pneumatic tire for construction vehicles according to claim 1, wherein the circumferential grooves are separated from the tire equator by at least 10% of the tread surface width and are disposed between the positions at ¼ of the tread surface width from the tire equator.

4. The heavy load pneumatic tire for construction vehicles according to claim 1, wherein the groove width of each of the circumferential grooves and the width direction grooves is such that opposing groove walls touch each other within a tire ground contact area.

5. A heavy load pneumatic tire for construction vehicles comprising:

side lug rows, at both side regions of a tread surface, formed by a plurality of lugs defined by lug grooves each opening to a respective tread end in a tread width direction, and a central block row aligned on a tire equator and formed by a plurality of blocks disposed between positions at ¼ of a tread surface width from the tire equator; and a directional tread pattern, with a designated rotation direction, formed by circumferential grooves and width direction grooves that define the blocks of the central block row and have groove widths narrower than that of the lug grooves, wherein a distance from the tire equator to a groove wall in each of the circumferential grooves defining the blocks is larger at a leading edge of each block than at a trailing edge of each block, and an inclination angle with respect to the tire equator of each of the circumferential grooves defining the blocks is in a range of 15° to 30°, and the groove width of each circumferential groove is in a range of 0.5% to 2.5% of the tread surface width.

6. A heavy load pneumatic tire for construction vehicles comprising:

side lug rows, at both side regions of a tread surface, formed by a plurality of lugs defined by lug grooves each opening to a respective tread end in a tread width direction, and a central block row aligned on a tire equator and formed by a plurality of blocks disposed between positions at ¼ of a tread surface width from the tire equator; and a directional tread pattern, with a designated rotation direction, formed by circumferential grooves and width direction grooves that define the blocks of the central block row and have groove widths narrower than that of the lug grooves, wherein a distance from the tire equator to a groove wall in each of the circumferential grooves defining the blocks is larger at a leading edge of each block than at a trailing edge of each block, and the width direction grooves defining the blocks extend from the tire equator in a range of at least 10% and less than 25% of the tread surface width and are each in communication with both lug grooves opening to the edges in the tread width direction, and the groove width of each of the width direction grooves is in a range of 3% to 8% of a pitch length of the blocks.

* * * * *